(12) United States Patent
Koob et al.

(10) Patent No.: US 7,801,164 B2
(45) Date of Patent: Sep. 21, 2010

(54) TWO DIMENSIONAL TIMEOUT TABLE MECHANISM WITH OPTIMIZED DELAY CHARACTERISTICS

(75) Inventors: Christopher Koob, Round Rock, TX (US); Ali A. Poursepanj, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1057 days.

(21) Appl. No.: 11/412,917

(22) Filed: Apr. 27, 2006

(65) Prior Publication Data

US 2007/0253451 A1 Nov. 1, 2007

(51) Int. Cl.
*H04L 12/56* (2006.01)
(52) U.S. Cl. .................................................. 370/412
(58) Field of Classification Search .................. 370/412
See application file for complete search history.

(56) References Cited

U.S. PATENT DOCUMENTS

| | | | | |
|---|---|---|---|---|
| 5,140,584 A | * | 8/1992 | Suzuki | 370/235 |
| 6,112,258 A | * | 8/2000 | Miller et al. | 710/19 |
| 6,438,134 B1 | * | 8/2002 | Chow et al. | 370/412 |
| 6,445,706 B1 | * | 9/2002 | Fransson et al. | 370/395.42 |
| 6,650,650 B1 | * | 11/2003 | Schneider et al. | 370/412 |
| 6,829,218 B1 | * | 12/2004 | Chen et al. | 370/230 |
| 6,937,561 B2 | * | 8/2005 | Chiussi et al. | 370/229 |
| 7,287,061 B2 | * | 10/2007 | Tsubota | 709/207 |
| 2004/0090974 A1 | * | 5/2004 | Balakrishnan et al. | 370/412 |
| 2004/0095885 A1 | * | 5/2004 | Yang | 370/235.1 |
| 2006/0029079 A1 | * | 2/2006 | Cohen et al. | 370/395.4 |
| 2006/0253814 A1 | * | 11/2006 | Porter et al. | 716/5 |

\* cited by examiner

*Primary Examiner*—Derrick W Ferris
*Assistant Examiner*—Mang Yeung
(74) *Attorney, Agent, or Firm*—Ryan, Mason & Lewis, LLP (57) ABSTRACT

Improved timeout table mechanism are disclosed. By way of example, a method for providing timeout delays for data queues in a processing system includes the following steps. A timeout structure is maintained. The timeout structure includes two or more groups, each group including two or more bins, each bin having a range of timeout delay values associated therewith, each group having a weight associated therewith, the weight of each group being based on a rate and a quantity of queues assignable to each group. A timeout delay value to be assigned to a data queue in the processing system is selected.

20 Claims, 3 Drawing Sheets

| GROUP NUMBER | GROUP RATE | NUMBER OF BINS | MAX DELAY |
|---|---|---|---|
| 0 | 4 | 8 | 32 |
| 1 | 8 | 16 | 128 |
| 2 | 16 | 32 | 512 |
| 3 | 32 | 64 | 2048 |
| 4 | 64 | 128 | 8192 |
| 5 | 128 | 128 | 16384 |
| 6 | 256 | 128 | 32768 |
| 7 | 512 | 128 | 65536 |
| 8 | 1024 | 128 | 131072 |
| 9 | 2048 | 128 | 262144 |
| 10 | 4096 | 128 | 524288 |
| 11 | 8192 | 128 | 1048576 |
| 12 | 16384 | 128 | 2097152 |
| 13 | 32768 | 128 | 4194304 |
| 14 | 65536 | 128 | 8388608 |
| 15 | 131072 | 128 | 16777216 |

FIG. 4

FIG. 5

TWO DIMENSIONAL TIMEOUT TABLE MECHANISM WITH OPTIMIZED DELAY CHARACTERISTICS

FIELD OF THE INVENTION

The present invention relates generally to packet processing systems, and more particularly to a network processor or other type of processor configured for use in performing packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

As is known, packet data that is to be processed by such network processors is maintained, at least temporarily, in one or more packet queues. Such packet data may include actual packets received by the packet switch or pointers to packets stored elsewhere. When packet data is needed for processing, the network processor obtains the packet data from the appropriate packet queue. However, due to the fact that the network processor may be forwarding the packet data to a device with limited processing capabilities (or a device that is bandwidth-restricted as a function of a service level agreement) and that, thus, requires transmission of the data to be carefully controlled, there is a need for a mechanism to control the stopping and restarting, i.e., delaying, of the transmission of packet data from the packet queues. One commonly used such delaying mechanism is known as a timeout table.

A timeout table is a data structure that maintains a set of timers. Timers are used to determine when "timeouts" occur, i.e., when a timer expires or a timeout value has been reached, indicating that a predetermined amount of time has passed and that therefore an action or processor function should be performed (i.e., begin or restart transmission of packet data from a packet queue to a network processor or some other device). Problems occur in the form of timeout errors (e.g., a timer expiring too late for a particular processor function), when a large amount of timers must be maintained.

One conventional form of timeout table is known as a one dimensional timeout table. Such a timeout table maintains a one dimensional list of entities (e.g., queues) that must be timed out at different times. However, such a table can be very large (consuming large amounts of memory), particularly when both small and large delays must be supported. In addition, there can be pathological jitter issues when entries having very different delays (i.e., delays having comparatively large time differences between them) happen to be placed in the same or in many adjacent slots of the one dimensional table.

Another conventional form of timeout table is known as a two dimensional timeout table. Such a timeout table maintains a list of groups, and within each group is a list of bins, wherein each bin has entities with different delays or timeout values associated therewith. While the two dimensional approach minimizes the memory space penalty of the one dimensional approach, the two dimensional data structure can cause an increase in the occurrence of timeout errors. Also, the two dimensional timeout table can experience significant congestion for the smallest delays due to the range of delays associated with entities stored in a single bin.

Accordingly, a need exists for improved timeout table mechanisms.

SUMMARY OF THE INVENTION

Principles of the invention provide improved timeout table mechanisms. While the principles of the invention are particularly suitable for use with network processors, they are not intended to be limited to a network processor environment.

By way of example, in one aspect of the invention, a method for providing timeout delays for data queues in a processing system includes the following steps. A timeout structure is maintained. The timeout structure includes two or more groups, each group including two or more bins, each bin having a range of timeout delay values associated therewith, each group having a weight associated therewith, the weight of each group being based on a rate and a quantity of queues assignable to each group. A timeout delay value associated with the timeout structure to be assigned to a data queue in the processing system is selected.

The method may further include obtaining a desired timeout value for the data queue to be delayed. Further, the desired timeout value may be compared to a delay range for each group to find the group with the smallest delay range that can accommodate the desired timeout value. Still further, for each bin, a value of (current time value+desired timeout value+(bin period value −1)) divided by the number of bins available in the group may be computed. The bin to which the data queue is to be assigned may be selected based on the computed values.

The method may also include maintaining two or more memory elements from which queues are dispatched when the timeout delay value assigned thereto has expired, i.e., maintain dispatch memory elements (e.g., first-in-first-out memory elements). A timed-out queue may be dispatched from one of the two or more dispatch memory elements based on the weights associated with each group. Further, a timed-out queue may be dispatched from one of the two or more dispatch memory elements based on the weights associated with each group modified by the number of entries in the two or more dispatch memory elements.

Still further, in another aspect of the invention, the timeout structure maintained as described herein may be shared across multiple output schedulers.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with an exemplary network processor that is part of a packet processing system. It should be understood, however, that the invention is more generally applicable to any data processing system in which it is desirable to avoid the drawbacks attributable to the use of existing timeout table mechanisms.

By way of example only, principles of the invention are applicable to packet processors such as those available from Agere Systems Inc. (Allentown, Pa.), e.g., network processors respectively identified as APP350, APP550, and APP650. However, it is to be understood that principles of the invention are not limited to these, or any, particular processors.

It is to be understood that the term "processor" as used herein may be implemented, by way of example and without limitation, utilizing a microprocessor, central processing unit (CPU), digital signal processor (DSP), application-specific integrated circuit (ASIC), or other type of data processing device or processing circuitry, as well as portions and combinations of these and other devices or circuitry.

Figure 1:
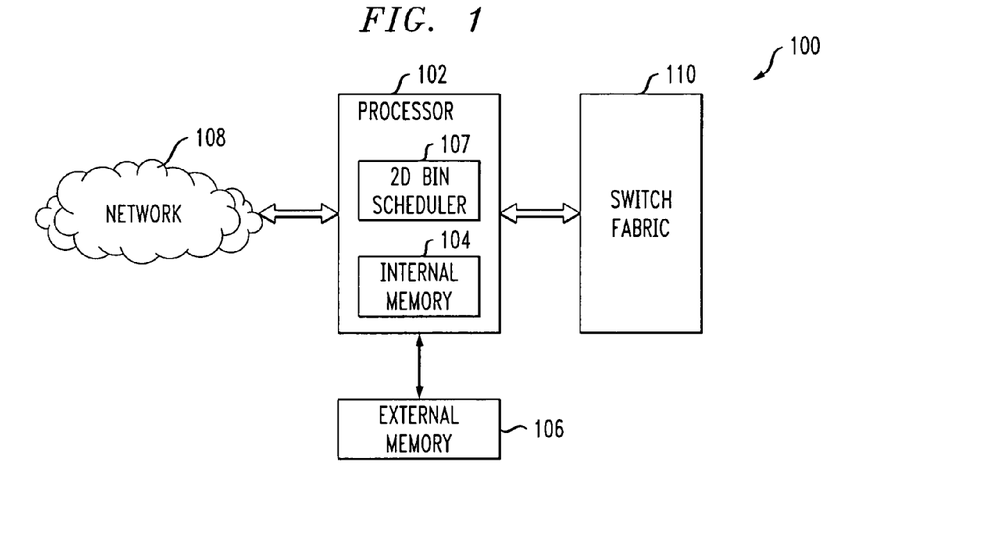
FIG. 1 is a block diagram illustrating a packet processing system in which embodiments of the invention may be implemented.

Referring to FIG. 1, an illustrative packet processing system 100 is shown in which embodiments of the invention are implemented. The system 100 includes a network processor 102 having an internal memory 104. The network processor 102 is coupled to an external memory 106 as shown, and is configured to provide an interface between a network 108 from which packets are received and a switch fabric 110 which controls switching of packet data. The processor 102 and its associated external memory 106 may be implemented, e.g., as one or more integrated circuits installed on a line card of a router or switch. In such a configuration, the switch fabric 110 is generally considered to be a part of the router or switch.

Although the memory 106 is shown in the figure as being external to the processor 102, the term "processor" as used herein, as indicated previously, is intended to be sufficiently broad to encompass elements 102 and 106.

Also, as illustratively shown, a timeout table mechanism, in the form of two dimensional (2D) bin scheduler 107, is implemented in network processor 102. The scheduler may make use of internal memory 104, external memory 106, or some other memory (not expressly shown), such that associated stored tables are readily accessible by the network processor 102.

It should be understood that the particular arrangement of system elements shown in FIG. 1 is by way of illustrative example only. For example, as previously noted, principles of the invention can be implemented in any type of packet processor, and is not limited to any particular packet processing application. For instance, such principles can be implemented in a processor (without a switch fabric) that is connected to multiple networks and switches between them. Still further, it is to be appreciated that principles of the invention can be implemented in software on general purpose processors.

Figure 2:
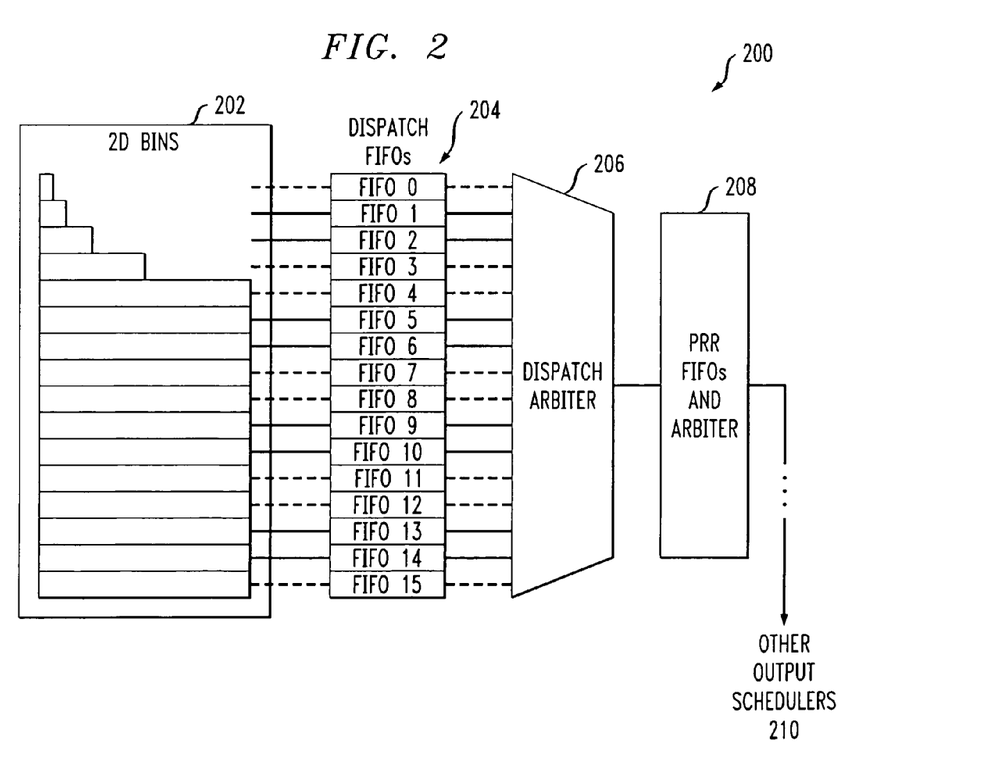
FIG. 2 is a block diagram illustrating a two dimensional bin scheduler, according to an embodiment of the invention.

FIG. 2 illustrates an embodiment of a two dimensional (2D) bin scheduler. As shown, 2D bin scheduler 200 includes 2D bins structure 202, dispatch FIFO (first-in first-out) memory elements (referred to as FIFOs) 204, dispatch arbiter 206, and programmable round robin (PRR) FIFOs and arbiter 208.

When a delay is needed, the appropriate group and bin are selected by the processor based upon the required delay. The queue to be delayed is then assigned to the appropriate delay value stored in the selected bin. As mentioned above, in the context of a network processor, such a delay or timeout is necessary to allow the processor to control transmission of the data stored in the timed-out queue.

Figure 3:
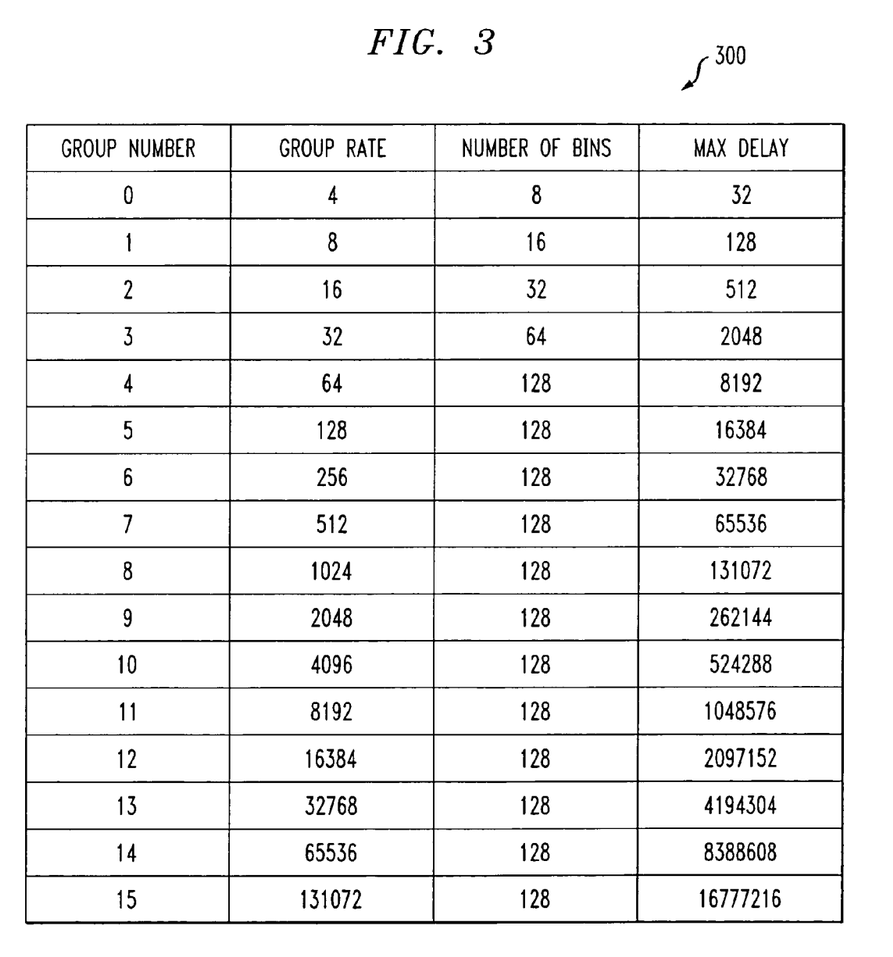
FIG. 3 is a diagram illustrating a table of group sizes, according to an embodiment of the invention.

Thus, 2D bins structure 202 is a non-linear timeout table. In this embodiment, the table is organized as 16 groups (0 . . . 15), where each group has up to 128 individual bins. Group i is accessed every $2^{i+1}$ clock events. FIG. 3 includes a table 300 that illustrates the sizes of each group used in this illustrative embodiment.

Within each group, the bins represent one time slot, i.e., a time equal to a unit time period. A unit time period is the rate at which the 2D bin structure is processed, i.e., it is the measure of time for the timeout table. The timeout table exists so that a queue may be time delayed for an approximate time period. When queues are placed in the 2D bin, they are placed on a linked list in a bin. The concept of a linked list structure is well known in the data processing arts and is not discussed further herein. When a queue is removed from the 2D bin, it and all other queues in a bin are collectively removed in linked list form.

Thus, as shown in FIG. 3, the 16 groups are indexed by log 2 of delay. Most of the groups have 128 bins, wherein each bin is indexed within each group by delay. The higher speed groups (top of table) have fewer bins. That is, group 0 is the group with the shortest delays, while group 15 is the group with the longest delays. Each group has a range of rates within a factor of four: groups 0-4 have a range of four, and groups 5-15 have a range of two. The longest timeout may be greater than one second, e.g., to support large packets.

Further, the weight of each group is determined by the rate (speed) and the number (quantity) of queues in the group. In this manner, delay and jitter are apportioned so that all queues experience approximately the same penalty relative to the desired delay. It is also to be appreciated that, for each group, the difference between the fastest delay and slowest delay is minimized.

By way of simple example, the relationship between groups and bins is as follows. Each group has multiple bins. Each bin is used for a range of timeouts. Assume a queue needs to be delayed for 1015 time units. One bin may represent a delay of 1010 time units. The next bin may represent a delay of 1020 time units. Since it is considered an error to timeout too soon, the bin representing 1020 time units is selected. Accordingly, that bin is used for any delay from 1011 units to 1020 time units. Also, it is to be noted that the size of each bin (in time units) doubles from group to group.

Figure 4:
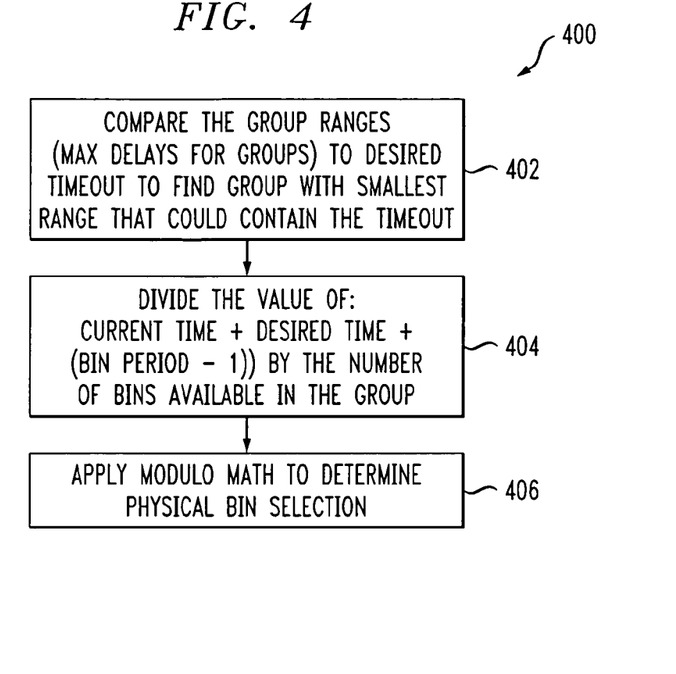
FIG. 4 is a flow diagram illustrating a methodology for placing a queue in a table for a desired timeout, according to an embodiment of the invention.

FIG. 4 illustrates a methodology 400 for placing a queue in the table for a desired timeout.

In step 402, the desired timeout is compared to the group ranges (i.e., "max delays" or maximum delays shown in FIG. 3) to find the group with the smallest range that could contain the timeout.

In step 404, the value of (current time+desired timeout+ (the bin period −1)) is divided by the number of bins available in the group. The result is rounded down. This gives the number of bin delays from time 0.

In step 406, conventional modulo math is applied to the result of step 404 to determine the physical bin selection.

Turning now to the determination of which queues should be removed from the timeout table, in one embodiment, the table is traversed at a fixed rate. Group 0 is processed every other time slot, group 1 every $4^{th}$ time slot, group 2 every $8^{th}$ time slot, and so on. In this manner, no more than one group is processed per time slot. In each group, when processed, the next bin is checked to determine if there are any entries in that bin that need to have their timer expired. This bin may contain multiple entries to be timed out. All the entries are moved to the appropriate dispatch FIFO (204) and then the FIFO dispatch arbiter (206) processes the entries.

The dispatch FIFO arbitration is a modified weighted scheme. The initial weight is based upon the group number. That is, group 1 has half the weight of group 0. However, the weight is modified based upon the depth of each dispatch FIFO. Thus, a group with a deep dispatch FIFO is assigned extra weight for processing from the dispatch FIFO.

Given the above description of main components of the illustrative 2D bin scheduler, the following description presents an example of pseudocode that may be employed to effectuate such a scheduling scheme.

Accordingly, the following is an example of pseudocode that may be employed to determine where in the timeout structure to schedule a queue that requires a delay:

```
Note: The_time is an exact time, i.e., it contains the fractional
position in a group.
    if (desired_time_out!= 0) {
        desired_time_out = desired_time_out/n; //Where
        n is the rate the scheduler is called.
        //Determine which group we fit into.
        for (i = 15; i >= 0; i--) {
            resolution = 2 * (int) pow(2,i);
            number_of_bins = 128;
            if (i == 0)
                number_of_bins = 8;
            }
            if (i == 1 ) {
                number_of_bins = 16;
            }
            if (i == 2 ) {
                number_of_bins = 32;
            }
            if (i == 3 ) {
                number_of_bins = 64;
            }
            if (number_of_bins > 128) {
                number_of_bins = 128;
            }
            group_range = number_of_bins * resolution −2*resolution;
            //Don't want to wrap into the next called bin.
            if ( desired_time_out < group_range ) {
                group = i;
                //Find a bin, but round up to the next highest.
                bin = (desired_time_out + the_time +
                resolution) /resolution )%number_of_bins;
            }
        }
    }
```

Further, the following is an example of pseudocode that may be employed to determine from where to remove queues. This code is executed once for each clock event:

```
Note: As the_time progresses, there is a value for which the_time will
select no group.
the_time++;
for (i = 0; i < 16; i++) {
    period = (in) pow(2,i);
    relevant_time = the_time% (int) pow(2,(i+1));
    if ( relevant_time == ( period − 1) ) {
        the_group = i;
    }
}
resolution = (int)pow(2,(the_group +1));
the_bin = (the (the_time/resolution)%number_of_bins_in_this_group.
```

Thus, as mentioned above, dispatch FIFOs 204 buffer queues from the 2D bin structure 202 until they can be assigned to individual schedulers. In this illustrative embodiment, the dispatch FIFOs include 16 individual FIFOs, one-to-one mapped, i.e., group 0 from the 2D bin is assigned to dispatch FIFO 0, and so on. As also mentioned above, the FIFOs are implemented as linked lists. When a linked list of queues is removed from the 2D bin structure, the list is placed on the tail of the appropriate linked list in the dispatch FIFO.

Queues are removed from the dispatch FIFO as quickly as possible. The selection of the queue to remove is controlled by arbiter 206. The arbitration attempts to give lower group numbers higher priority. The following is illustrative pseudocode for implementing this arbitration approach:

```
//find highest priority fifo.
for (i = 0; i < 16; i++) {
    fifo_transmit_last[i]++;
    //Round down, but use the most significant digit.
    log_size = int (log ((float)the_bin_fifos[i].size) / log ((float)2));
    adjusted_size = (int)pow(2,(log_size));
    priority = adjusted_size * (fifo_weight[i] * fifo_transmit_last[i]);
    //priority = the_bin_fifos[i].size * (fifo_weight[i] *
    fifo_transmit_last[i]);
    if ( the_bin_fifos[i].size == 0 ) {
        priority = 0;
        fifo_transmit_last[i] = 0;
    }
    if (priority > highest_priority) {
        highest_priority_fifo = i;
        highest_priority = priority;
    }
}
Where
    fifo_weight[0]    = (int)pow(2,(24-5));
    fifo_weight[1]    = (int)pow(2,(24-7));
    fifo_weight[2]    = (int)pow(2,(24-9));
    fifo_weight[3]    = (int)pow(2,(24-11));
    fifo_weight[4]    = (int)pow(2,(24-13));
    fifo_weight[5]    = (int)pow(2,(24-14));
    fifo_weight[6]    = (int)pow(2,(24-15));
    fifo_weight[7]    = (int)pow(2,(24-16));
    fifo_weight[8]    = (int)pow(2,(24-17));
    fifo_weight[9]    = (int)pow(2,(24-18));
    fifo_weight[10]   = (int)pow(2,(24-19));
    fifo_weight[11]   = (int)pow(2,(24-20));
    fifo_weight[12]   = (int)pow(2,(24-21));
    fifo_weight[13]   = (int)pow(2,(24-22));
    fifo_weight[14]   = (int)pow(2,(24-23));
    fifo_weight[15]   = (int)pow(2,(24-24));
```

Referring back to FIG. 2, it is shown that scheduler 200 also includes PRR FIFOs and arbiter 208.

In this illustrative embodiment, it is assumed that scheduler 200 has four PRR FIFOs to which queues from the dispatch FIFO are assigned. The assignment to a PRR FIFO may be either a pre-computed mapping that maps dispatch FIFO groups to a specific PRR FIFO, or controlled by a configuration in the queue itself Additionally, queues that have been scheduled and do not need to be timed out in the 2D bin structure are returned to the PRR FIFOs. The particular PRR FIFO is determined by configuration in the queue.

In one embodiment, a pre-computed mapping of dispatch FIFOs to PRR FIFOs is as follows: groups 0 and 1 map to PRR FIFO 0; groups 2 and 3 map to PRR FIFO 1; groups 4, 5, and 6 map to PRR FIFO 2; and all other groups map to PRR FIFO 3.

Queues are pulled from the PRR FIFOs based on the PRR arbiter. This may be accomplished with a weighted work conserving algorithm such as follows:

```
    counter++;
    counter = counter%16;
    counter_0 = counter%2; //count[0]
    counter_1 = counter%4; //count[1:0]
    counter_2 = counter%8; //count[2:0]
    counter_3 = counter%16; //count[3:0]
    distance_0 = (2 - counter_0)%2;
    distance_1 = (5 - counter_1)%4;
    distance_2 = (11 - counter_2)%8;
    distance_3 = (23 - counter_3)% 16;
    if ( the_bin_fifos[0].size==0 ) {
       distance_0 = 16;
    }
    if ( the_bin_fifos[1].size==0 ) {
       distance_1 = 16:
    }
    if ( the_bin_fifos[2].size==0 ) {
       distance_2 = 16;
    }
    if ( the_bin_fifos[3].size == 0 ) {
       distance_3 = 16;
    }
    //pick group
    if (distance_0 <= distance_0 && distance_0 <=
distance_1 && distance_0) <= distance_2 && distance_0 <=
distance_3) {
       highest_priority_fifo = 0;
       counter = counter + distance_0;
    } else
    if (distance_1 <= distance_0 && distance_1 <= distance_1 &&
distance_1 <= distance_2 && distance_1 <=
distance_3) {
       highest_priority_fifo = 1;
       counter = counter + distance_1
    } else
    if (distance_2 <= distance_0 && distance_2 <= distance_1 &&
distance_2 <= distance_2 && distance_2 <=
distance_3) {
       highest_priority_fifo = 2;
       counter = counter +distance_2;
    } else
    if (distance_3 <= distance_0 && distance_3 <= distance_1 &&
distance_3 <= distance_2 && distance_3 <=
distance_3) {
       highest_priority_fifo = 3;
       counter = counter + distance_3;
    }
```

It is to be understood that while the embodiment of FIG. 2 employs PRR FIFOs and arbiter 208, the timeout table mechanism of the invention can operate just as well if the output of the dispatch FIFO were to be scheduled directly instead of going to the PRR. However, the use of the PRR structure has at least one additional advantage. A single 2D bin mechanism can be shared across many unrelated output paths by the use of the 2D bin/PRR architecture of FIG. 2. Thus, advantageously, a single 2D bin structure can be shared across many output schedulers. This is shown in FIG. 2 (other output schedulers 210).

Figure 5:
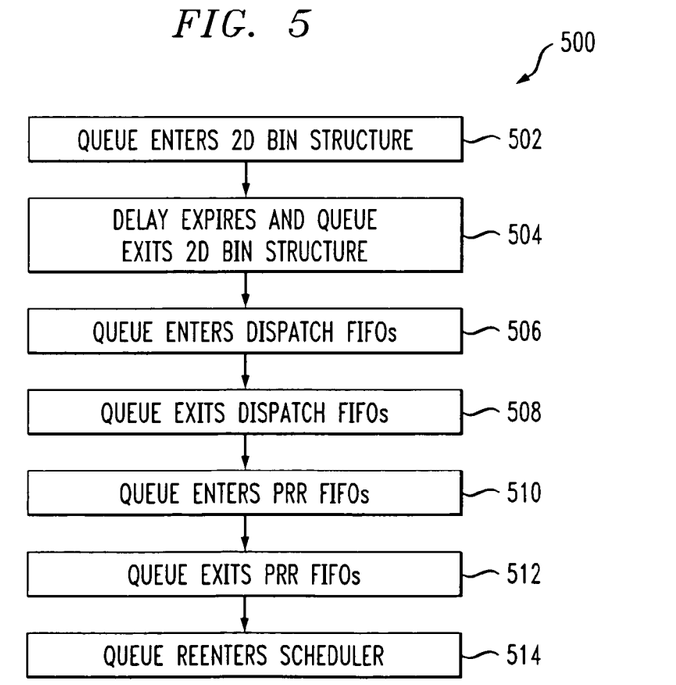
FIG. 5 is a flow diagram illustrating an overall processing loop for a subject queue in a 2D bin scheduler, according to an embodiment of the invention.

Lastly, FIG. 5 illustrates an overall processing loop 500 for a subject queue in a 2D bin scheduler. As shown, in step 502, the queue enters the timeout structure (2D bin structure 202). The timer (delay) assigned thereto expires and the queue exits the timeout structure, in step 504. In step 506, the queue enters the dispatch FIFOs (204). In step 508, the queue exits the dispatch FIFOs. In step 510, the queue enters the PRR FIFOs (208). In step 512, the queue exits the PRR FIFOs. At this point, data associated with the queue is transmitted for use by the network processor. In step 514, if necessary, the queue may reenter the scheduler.

Thus, in accordance with the embodiments described herein, for each time slot, one bins worth of queues are added to the corresponding dispatch FIFO. The dispatch arbiter selects one queue to move to the corresponding PRR FIFO each time slot. Arbitration is weighted fairly between groups. The weight of each group is determined by the rate (speed) and the number (quantity) of queues in the group. In this manner, delay and jitter are apportioned so that all queues experience approximately the same penalty relative to the desired delay. It is also to be appreciated that, for each group, the difference between the fastest delay and slowest delay is minimized.

It is to be understood that while network processor 102 of FIG. 1 illustrates a single scheduler 107, a network processor may employ more than one such scheduler.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for providing timeout delays for data queues in a processing system, comprising:
   a memory; and
   a processor coupled to the memory and operative to: (i) maintain a timeout structure comprising two or more groups, each group comprising two or more bins, each group having associated therewith a range of timeout delay values, each bin of a given group having associated therewith a portion of the range of timeout delay values associated with the given group, each group having a weight associated therewith, the weight of each group being based on a rate and a quantity of queues assignable to each group; and (ii) select a timeout delay value associated with the timeout structure to be assigned to a data queue in the processing system.

2. The apparatus of claim 1, wherein the processor is further operative to obtain a desired timeout value for the data queue to be delayed.

3. The apparatus of claim 2, wherein the processor is further operative to compare the desired timeout value to the delay range for each group to find the group with the smallest delay range that can accommodate the desired timeout value.

4. The apparatus of claim 1, wherein the processor is further operative to maintain two or more memory elements from which queues are dispatched when the timeout delay value assigned thereto has expired.

5. The apparatus of claim 1, wherein the processor comprises a network processor and the data queue comprises a packet data queue.

6. The apparatus of claim 1, wherein the processor and at least a portion of the memory are implemented on an integrated circuit.

7. Apparatus for providing timeout delays for data queues in a processing system, comprising:
   a memory; and
   a processor coupled to the memory and operative to: (i) maintain a timeout structure comprising two or more groups, each group comprising two or more bins, each bin having a range of timeout delay values associated therewith, each group having a weight associated therewith, the weight of each group being based on a rate and a quantity of queues assignable to each group; and (ii) select a timeout delay value associated with the timeout structure to be assigned to a data queue in the processing system;
   wherein the processor is further operative to: obtain a desired timeout value for the data queue to be delayed; compare the desired timeout value to a delay range for each group to find the group with the smallest delay range that can accommodate the desired timeout value; and compute for each bin a value of (current time value+ desired timeout value+(bin period value −1)) divided by the number of bins available in the group.

8. The apparatus of claim 7, wherein the processor is further operative to select the bin to which the data queue is to be assigned based on the computed values.

9. Apparatus for providing timeout delays for data queues in a processing system, comprising:
   a memory; and
   a processor coupled to the memory and operative to: (i) maintain a timeout structure comprising two or more groups, each group comprising two or more bins, each bin having a range of timeout delay values associated therewith, each group having a weight associated therewith, the weight of each group being based on a rate and a quantity of queues assignable to each group; and (ii) select a timeout delay value associated with the timeout structure to be assigned to a data queue in the processing system;
   wherein the processor is further operative to maintain two or more memory elements from which queues are dispatched when the timeout delay value assigned thereto has expired; and
   wherein the processor is further operative to dispatch a timed-out queue from one of the two or more memory elements based on the weights associated with each group.

10. Apparatus for providing timeout delays for data queues in a processing system, comprising:
   a memory; and
   a processor coupled to the memory and operative to: (i) maintain a timeout structure comprising two or more groups, each group comprising two or more bins, each bin having a range of timeout delay values associated therewith, each group having a weight associated therewith, the weight of each group being based on a rate and a quantity of queues assignable to each group; and (ii) select a timeout delay value associated with the timeout structure to be assigned to a data queue in the processing system;
   wherein the processor is further operative to maintain two or more memory elements from which queues are dispatched when the timeout delay value assigned thereto has expired; and
   wherein the processor is further operative to dispatch a timed-out queue from one of the two or more dispatch memory elements based on the weights associated with each group as modified by the number of entries in the two or more dispatch memory elements.

11. A method for providing timeout delays for data queues in a processing system, the method comprising the steps of:
   maintaining, by a processor in the processing system, a timeout structure comprising two or more groups, each group comprising two or more bins, each group having associated therewith a range of timeout delay values, each bin of a given group having associated therewith a portion of the range of timeout delay values associated therewith the given group, each group having a weight associated therewith, the weight of each group being based on a rate and a quantity of queues assignable to each group; and
   selecting, by a processor in the processing system, a timeout delay value associated with the timeout structure to be assigned to a data queue in the processing system.

12. The method of claim 11, further comprising the step of obtaining a desired timeout value for the data queue to be delayed.

13. The method of claim 12, further comprising the step of comparing the desired timeout value to the delay range for each group to find the group with the smallest delay range that can accommodate the desired timeout value.

14. The method of claim 11, further comprising the step of maintaining two or more memory elements from which queues are dispatched when the timeout delay value assigned thereto has expired.

15. The method of claim 11, wherein the timeout structure is shared across multiple output schedulers.

16. A method for providing timeout delays for data queues in a processing system, the method comprising the steps of:
   maintaining, by a processor in the processing system, a timeout structure comprising two or more groups, each group comprising two or more bins, each bin having a range of timeout delay values associated therewith, each group having a weight associated therewith, the weight of each group being based on a rate and a quantity of queues assignable to each group; and
   selecting, by a processor in the processing system, a timeout delay value associated with the timeout structure to be assigned to a data queue in the processing system;
   wherein the method further comprises the steps of: obtaining a desired timeout value for the data queue to be delayed; comparing the desired timeout value to a delay range for each group to find the group with the smallest delay range that can accommodate the desired timeout value; and computing for each bin a value of (current time value+desired timeout value+(bin period value −1)) divided by the number of bins available in the group.

17. The method of claim 16, further comprising the step of selecting the bin to which the data queue is to be assigned based on the computed values.

18. A method for providing timeout delays for data queues in a processing system, the method comprising the steps of:
   maintaining, by a processor in the processing system, a timeout structure comprising two or more groups, each group comprising two or more bins, each bin having a range of timeout delay values associated therewith, each group having a weight associated therewith, the weight of each group being based on a rate and a quantity of queues assignable to each group;
   selecting, by a processor in the processing system, a timeout delay value associated with the timeout structure to be assigned to a data queue in the processing system;
   maintaining two or more memory elements from which queues are dispatched when the timeout delay value assigned thereto has expired; and
   dispatching a timed-out queue from one of the two or more dispatch memory elements based on the weights associated with each group.

19. A method for providing timeout delays for data queues in a processing system, the method comprising the steps of:
   maintaining, by a processor in the processing system, a timeout structure comprising two or more groups, each group comprising two or more bins, each bin having a range of timeout delay values associated therewith, each group having a weight associated therewith, the weight of each group being based on a rate and a quantity of queues assignable to each group;
   selecting, by a processor in the processing system, a timeout delay value associated with the timeout structure to be assigned to a data queue in the processing system;

maintaining two or more memory elements from which queues are dispatched when the timeout delay value assigned thereto has expired; and dispatching a timed-out queue from one of the two or more dispatch memory elements based on the weights associated with each group modified by the number of entries in the two or more dispatch memory elements.

20. Apparatus for providing timeout delays for data queues in a processing system, comprising:

a data structure, stored in a memory element, comprising two or more groups, each group comprising two or more bins, each group having associated therewith a range of timeout delay values, each bin of a given group having associated therewith a portion of the range of timeout delay values associated with the given group, the weight of each group being based on a rate and a quantity of queues assignable to each group; and two or more other memory elements to which queues are dispatched when the timeout delay value assigned thereto, from the data structure stored in the memory element, has expired.

* * * * *

UNITED STATES PATENT AND TRADEMARK OFFICE
CERTIFICATE OF CORRECTION

| | | |
|---|---|---|
| PATENT NO. | : 7,801,164 B2 | Page 1 of 1 |
| APPLICATION NO. | : 11/412917 | |
| DATED | : September 21, 2010 | |
| INVENTOR(S) | : Christopher Koob et al. | |

It is certified that error appears in the above-identified patent and that said Letters Patent is hereby corrected as shown below:

Claim 11, col. 9, line 61, please delete "therewith" and insert --with--.

Signed and Sealed this

Twenty-first Day of December, 2010

David J. Kappos
*Director of the United States Patent and Trademark Office*